US009104183B2

(12) United States Patent
Zheng et al.

(10) Patent No.: US 9,104,183 B2
(45) Date of Patent: Aug. 11, 2015

(54) ADVANCED HUMAN-MACHINE INTERFACE FOR COLLABORATIVE BUILDING CONTROL

(71) Applicant: Siemens Corporation, Iselin, NJ (US)

(72) Inventors: Xianjun S. Zheng, Plainsboro, NJ (US); Zhen Song, Plainsboro, NJ (US); Yanzi Chen, Philadelphia, PA (US); Shaopeng Zhang, Plainsboro, NJ (US); Yan Lu, West Windsor, NJ (US)

(73) Assignee: Siemens Corporation, Iselin, NJ (US)

( * ) Notice: Subject to any disclaimer, the term of this patent is extended or adjusted under 35 U.S.C. 154(b) by 376 days.

(21) Appl. No.: 13/651,510

(22) Filed: Oct. 15, 2012

(65) Prior Publication Data

US 2013/0110295 A1  May 2, 2013

Related U.S. Application Data

(60) Provisional application No. 61/546,725, filed on Oct. 13, 2011.

(51) Int. Cl.
| | |
|---|---|
| G05B 13/02 | (2006.01) |
| H04L 12/28 | (2006.01) |
| H04L 12/24 | (2006.01) |

(52) U.S. Cl.
CPC ............ *G05B 13/02* (2013.01); *H04L 12/2818* (2013.01); *H04L 12/2821* (2013.01); *H04L 12/2825* (2013.01); *H04L 41/0833* (2013.01); *H04L 2012/285* (2013.01)

(58) Field of Classification Search
CPC ................ G05B 13/02; H04L 12/2821; H04L 2012/285; H04L 12/2818; H04L 12/2825; H04L 41/0833
USPC ............ 700/22, 19–20, 17, 83, 286, 291, 295
See application file for complete search history.

(56) References Cited

U.S. PATENT DOCUMENTS

| | | | | |
|---|---|---|---|---|
| 6,058,307 | A  * | 5/2000 | Garner ......................... | 455/428 |
| 7,130,719 | B2 * | 10/2006 | Ehlers et al. .................. | 700/276 |

(Continued)

FOREIGN PATENT DOCUMENTS

WO  2009/050674 A1  4/2009

OTHER PUBLICATIONS

"A Multi-Agent System for Building Control"; Bing Qiao, et al.; Intelligent Agent Technology, 2006. IAT '06. IEEE/WIC/ACM International Conference ON, IEEE, PI, pp. 653-659; XP031002986, ISBN: 978-0-7695-2748-2.

(Continued)

*Primary Examiner* — Ramesh Patel

(57) ABSTRACT

A system for collaborative energy management and control in a building, including an energy management controller, one or more occupant HMIs that supports two-way communication between building occupants and a facility manager, and between building occupants and the energy management controller, and a facility manager HMI that supports two-way communication between the facility manager and the building occupants, and between the facility manager and the energy management controller, in which the occupant HMI allows building occupants to provide temperature preferences to the facility manager and the energy management controller, and the facility manager HMI allows the facility manager to configure an energy policy for the building as a set of rules and to view occupants' aggregated temperature preferences, and the energy management controller determines an optimum temperature range that resolves conflicting occupant temperature preferences and occupant temperature preferences that conflict with the facility manager's energy policy for the building.

19 Claims, 15 Drawing Sheets

(56) References Cited

U.S. PATENT DOCUMENTS

| | | | |
|---|---|---|---|
| 7,343,226 B2* | 3/2008 | Ehlers et al. | 700/276 |
| 7,653,443 B2* | 1/2010 | Flohr | 700/14 |
| 8,442,693 B2* | 5/2013 | Mirza et al. | 700/276 |
| 2010/0106332 A1* | 4/2010 | Chassin et al. | 700/278 |
| 2010/0106641 A1* | 4/2010 | Chassin et al. | 705/40 |
| 2013/0054758 A1* | 2/2013 | Imes et al. | 709/219 |
| 2013/0204443 A1* | 8/2013 | Steven et al. | 700/286 |

OTHER PUBLICATIONS

Jonathan A. Wright et al: "Optimization of building thermal design and control by multi-criterion genetic algorithm", Energy & Buildings, vol. 34, No. 9, Oct. 1, 2002, pp. 959-972, XP55050699, ISSN: 0378-7788, DOI: 10.1016/S0378-7788(02)00071-3 abstract.

International Search Report dated Feb. 5, 2013.

* cited by examiner

ADVANCED HUMAN-MACHINE INTERFACE FOR COLLABORATIVE BUILDING CONTROL

CROSS REFERENCE TO RELATED UNITED STATES APPLICATIONS

This application claims priority from "System with Advanced Human-machine interface for Collaborative Building Control to Achieve High Performance", U.S. Provisional Application No. 61/546,725 of Zheng, et al., filed Oct. 13, 2011, the contents of which are herein incorporated by reference in their entirety.

GOVERNMENT LICENSE RIGHTS

This invention was made with Government support under Prime Award No. DE-EE0003843 awarded by the Department of Energy. The Government has certain rights in this invention.

TECHNICAL FIELD

This disclosure is directed to methods for controlling energy in commercial buildings.

DISCUSSION OF THE RELATED ART

Energy related control policies for commercial buildings, such as HVAC policies, lighting schedules, and set points, are typically defined and imposed by facility managers based on their own experience or some coarsely defined industry standard, such as an ASHRAE (American Society of Heating, Refrigerating and Air Conditioning Engineers) comfort model. Occupants, who are the end users of a building, typically have no opportunity to contribute to the definition of control policies, or have limited means to communicate with facility managers or other occupants for their specific needs or preferences. FIG. 1 illustrates current communication patterns among different players with the standard human-machine interface (HMI). As indicated by the solid arrows 12, the facility manager 11 can directly communicate with the various device controls 13 in a building, and can directly receive feedback from these device control systems. However, the dotted arrows 14 between the facility manager 11 and the occupants 15 represent the much more limited communications between the two entities. This one way, top-down process of policy definition often results in two consequences. On the one hand, circumstance, facility managers who implement aggressive energy policies often achieve energy savings with some or significant sacrifice in occupant comfort. On another hand, under some other circumstances, facility managers often must relax their energy policies to avoid occupant complaints, reducing the opportunity for energy savings. In addition, under worst case circumstances that are quite common, facility managers often over-react to occupant complaints by setting cooling setpoints too low or raising heating setpoints too high which brings both energy waste and occupant comfort complaints. Several recent studies showed that building control policies that take into consideration occupants' activities and needs have the potential to significantly optimize energy saving and also to improve occupants' comfort experience. For example, demand-controlled ventilation alone can theoretically achieve 10 to 15% reduction of HVAC energy. Nevertheless, state of the art building automation systems (BASs) seldom deliver as much cost/benefit as expected, due to the high cost and reliability issue of occupancy sensors. Even though occupant engagement can introduce 40% or more energy savings, occupants are excluded from today's energy management systems because of technology limitations, due to a lack of systematic approaches and tools that can facilitate communications and collaborations between occupants and facility managers, and between the occupants themselves.

SUMMARY

Exemplary embodiments of the invention as described herein generally include a low-cost collaborative energy management and control (cEMC) methods and systems that allows interactive communications among occupants, facility managers and building control systems with advanced human machine interfaces (HMI) based on the latest visualization and social network technology. FIG. 2 illustrates enhanced communication patterns among different players with an advanced HMI, according to an embodiment of the invention. As indicated by the solid arrows 22, the facility manager 21 can directly communicate with the various device controls 23 in a building, and can directly receive feedback from these device control systems. However, the solid arrows 24 between the facility manager 21 and the occupants 25 represent a direct two-way communications between the two entities, and the solid arrows 26 between the occupants 25 and the various device controls 23 indicate an ability for the occupants 25 to directly control building functions and receive feedback from the control systems 23. In particular, a system according to an embodiment of the invention can save at least 30% to 50% of a building's annual energy consumption through occupancy-based building HVAC control, lighting control and plug load control. In addition, a cEMC system according to an embodiment of the invention can respond to demand response commands from the facility manager, and achieve 20% peak load shedding within 15 minutes.

According to an aspect of the invention, there is provided a system for collaborative energy management and control in a building, including an energy management controller for a building, one or more occupant human-machine interfaces (HMIs) that supports two-way communication between building occupants and a facility manager, and between building occupants and the energy management controller, and a facility manager HMI that supports two-way communication between the facility manager and the building occupants, and between the facility manager and the energy management controller, in which the occupant HMI allows building occupants to provide comfort preferences to the facility manager and the energy management controller, and the facility manager HMI allows the facility manager to configure an energy policy for the building as a set of rules and to view occupants' aggregated comfort preferences, and the energy management controller determines optimum comfort parameter ranges that resolves conflicting occupant comfort preferences and occupant comfort preferences that conflict with the facility manager's energy policy for the building.

According to a further aspect of the invention, the occupant HMI allows building occupants to provide schedule information to the facility manager and energy management controller, wherein the schedule specifies different activities for each occupant, wherein the energy management controller supports an individual schedule for each occupant and their specific activities, and provides cooling, heating, ventilation and lighting in the building as determined by the occupants' schedule and activity information.

According to a further aspect of the invention, the occupant HMI displays occupant energy use in real-time, changes in energy use due to changes in the occupant's comfort parameters, and long term energy use trends based on the occupant's specific activities as determined by the energy management controller.

According to a further aspect of the invention, the comfort parameters include temperature, humidity, lighting and ventilation, and said occupant HMI provides a temperature and humidity ranges for the comfort parameters to the facility manager and the energy management controller.

According to a further aspect of the invention, the system includes a social network supported by the occupant HMIs and the facility HMI, the social network adapted to facilitating communication between the occupants and the facility manager, and allowing occupants to provide feedback to the facility manager regarding building conditions, and allowing facility managers to disseminate information to all the occupants.

According to a further aspect of the invention, the social network is provided by a third party.

According to a further aspect of the invention, the social network is provided over a network internal to the collaborative energy management and control system for the building.

According to a further aspect of the invention, the system includes a plurality of rule file apps, the rule file apps describing occupants' comfort control preferences and the facility manager's energy policy in a format executable by the energy management controller.

According to another aspect of the invention, there is provided a system for collaborative energy management and control in a building, including one or more occupant human-machine interfaces (HMIs) that supports two-way communication between building occupants and a facility manager, a facility manager HMI that supports two-way communication between the facility manager and the building occupants, in which the occupant HMI allows building occupants to provide comfort preferences to the facility manager, and the facility manager HMI allows the facility manager to configure an energy policy for the building as a set of rules and to view occupants' aggregated comfort preferences, and a social network supported by the occupant HMIs and the facility HMI, the social network adapted to facilitating communication between the occupants and the facility manager, and allowing occupants to provide feedback to the facility manager regarding building conditions, and allowing facility managers to disseminate information to all the occupants.

According to a further aspect of the invention, the system includes an energy management controller for the building adapted to determining an optimum comfort parameter range that resolves conflicting occupant comfort preferences and occupant comfort preferences that conflict with the facility manager's energy policy for the building, in which the occupants' HMI supports two-way communication between building occupants and the energy management controller, and the facility manager's HMI supports two-way communication between the facility manager and the energy management controller.

According to a further aspect of the invention, the system includes a plurality of rule file apps, the rule file apps describing occupants' comfort control preferences and the facility manager's energy policy in a format executable by the energy management controller.

According to another aspect of the invention, there is provided a non-transitory program storage device readable by a computer, tangibly embodying a program of instructions executed by the computer to implement a system for collaborative energy management and control in a building.

DETAILED DESCRIPTION OF EXEMPLARY EMBODIMENTS

Figure 1:
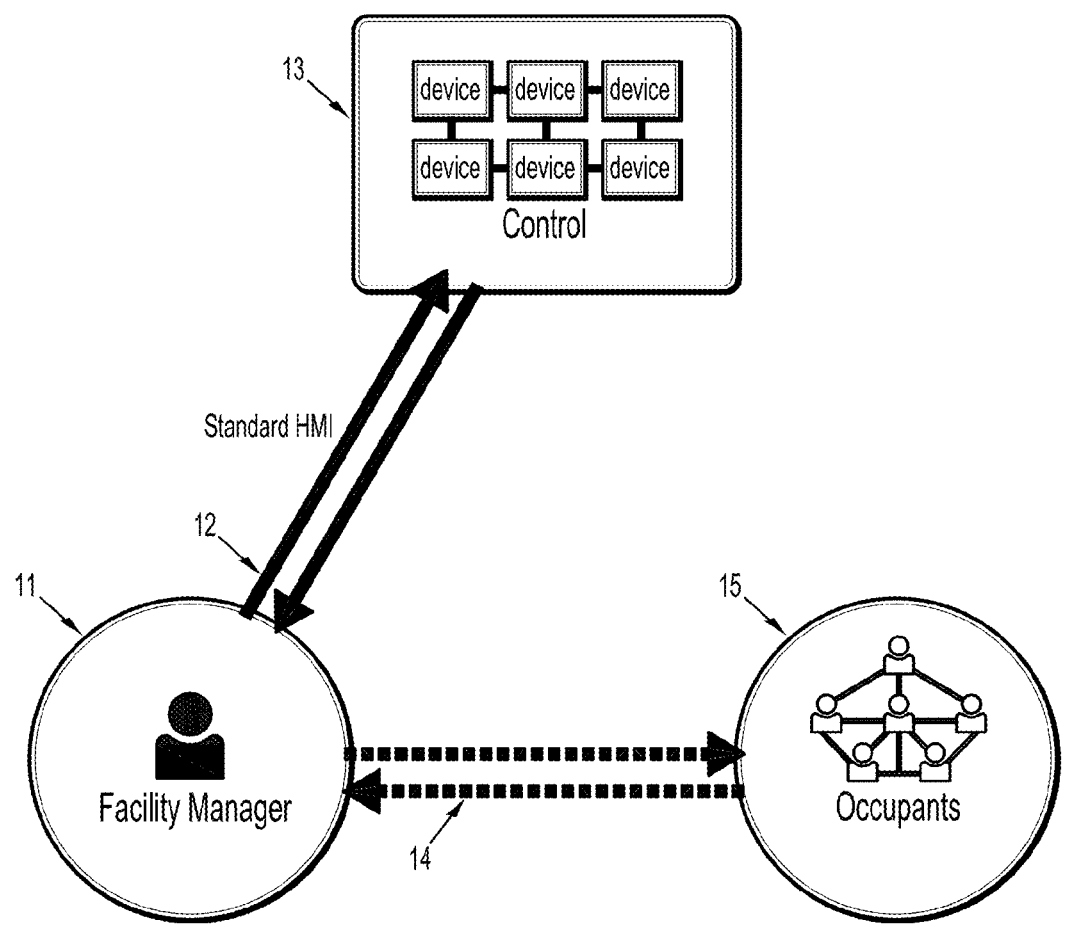
FIG. 1 illustrates current communication patterns among different players with a standard HMI, according to an embodiment of the invention.
Figure 2:
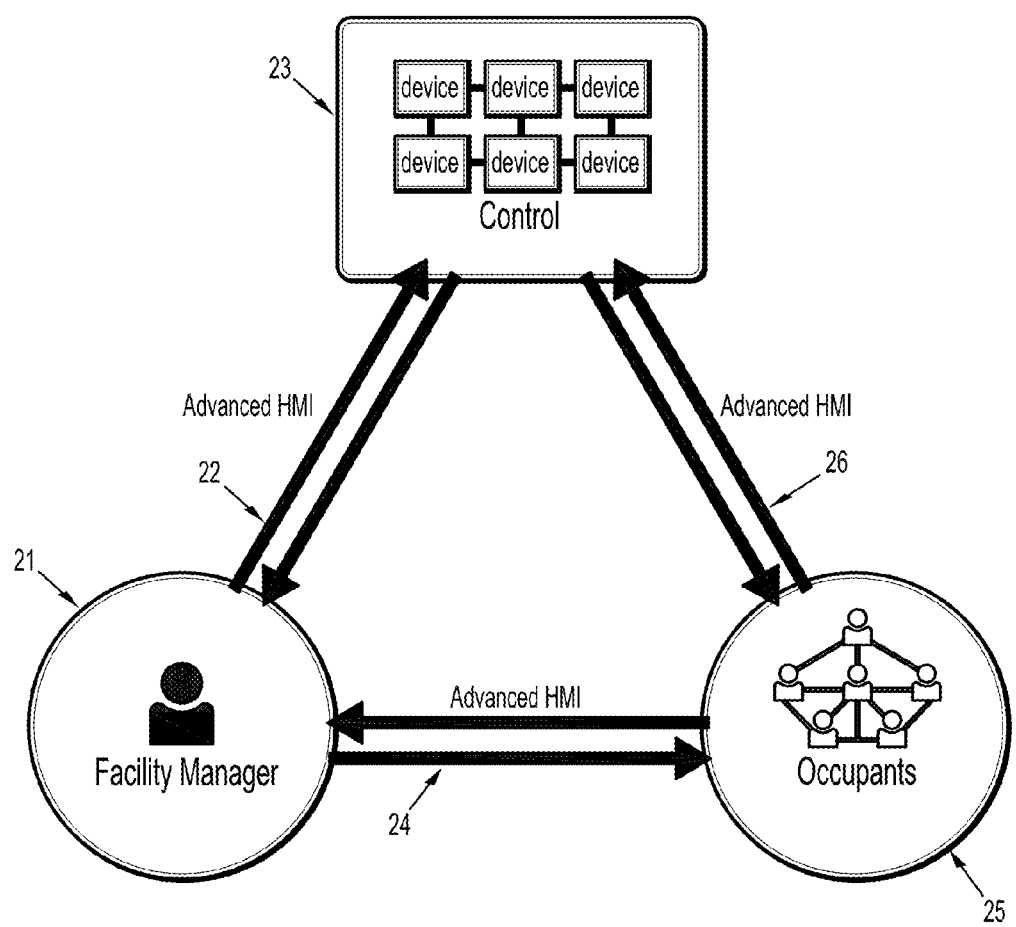
FIG. 2 illustrates enhanced communication patterns among different players with an advanced HMI, according to an embodiment of the invention.

Exemplary embodiments of the invention as described herein generally include systems for an advanced human-machine interface for collaborative building control, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

Figure 3:
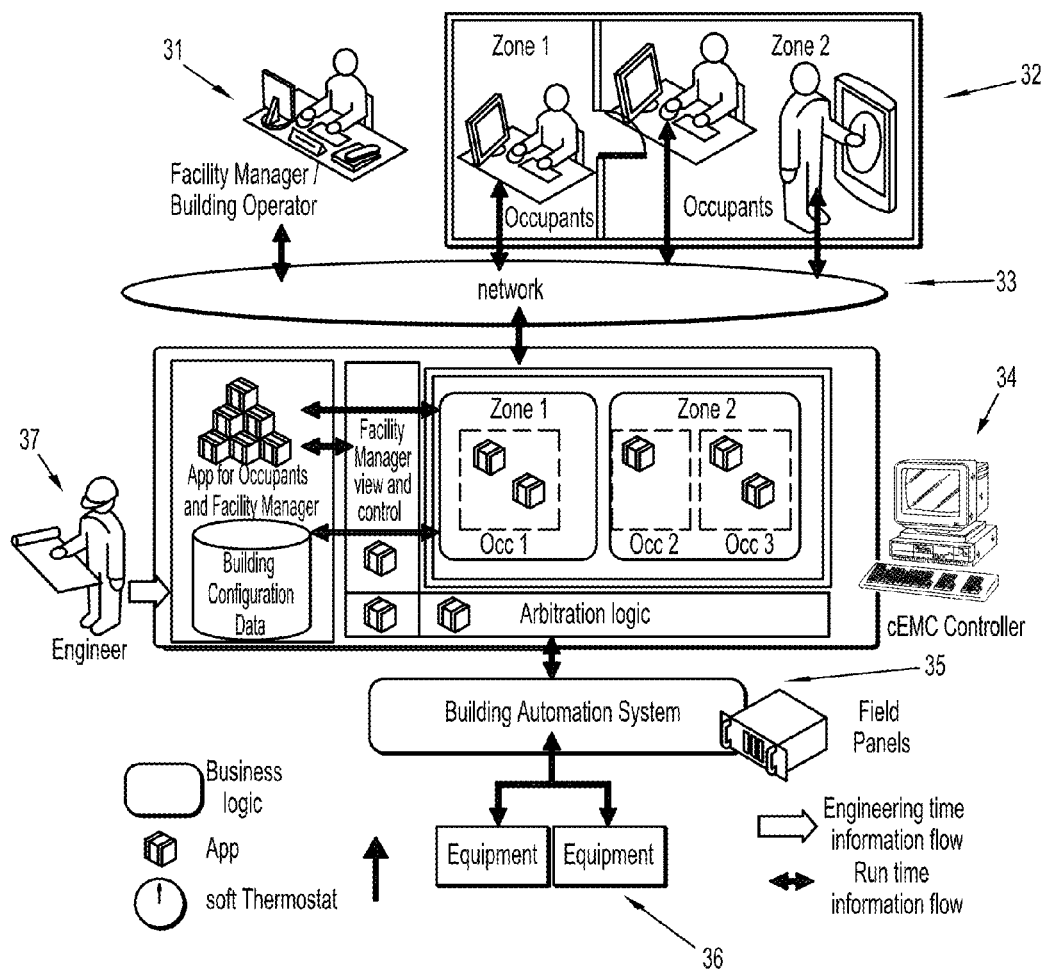
FIG. 3 illustrates an exemplary cEMC architectural, according to an embodiment of the invention.

A cEMC according to an embodiment of the invention is a vendor independent software platform which extends an existing building automation system (BAS) by means of active occupant engagement in energy management and comfort control. FIG. 3 illustrates an exemplary, non-limiting architecture, where the communication between cEMC and BAS is based on industry standard building automation and control networks (BACnet). As shown in FIG. 3, the facility manager 31 and occupants 32 can access the a cEMC controller 34 according to an embodiment of the invention via advanced HMI's connected to a network 33, such as a BACnet 33. The cEMC controller 34 according to an embodiment of the invention includes modules and apps that interact respectively with the occupants, the facility manager, and for building engineers 37 who provide building configuration data. The cEMC controller 34 according to an embodiment of the invention also communicates with the BAS 35, which in turn control and receives feedback from the various building equipment 36. An energy management control system according to an embodiment of the invention can then communicates the set points and other commands to the building automation system 37 controlling the building 38 via BACnet points.

An architecture according to an embodiment of the invention leverages traditional BAS architecture by a broad spectrum of communication methods. The performances of traditional BASs can be jeopardized by outdated communication methods: facility managers may need to negotiate face-to-face with occupants in cases of occupant conflicts or complaints. Dissatisfaction can accumulate if an occupant's desirable settings have been changed by another unknown occupant.

At the heart of a cEMC system according to an embodiment of the invention is the cEMC controller 34, which interconnects building occupants, the facility manage, and BAS, and applies both occupancy based energy management and comfort based building environmental control to maximize building energy efficiency. The collaborative HMIs according to an embodiment of the invention, which provide monitor and control interfaces for occupants and building operators, may be referred to herein below as a "softThermostat" and an "FMDashboard", respectively. Occupants can directly submit their comfort needs to the cEMC system through soft-Thermostats while the facility manager can configure energy policy as rules and issue demand response commands from an FMDashboard. The cEMC Controller according to an embodiment of the invention can detect and resolves conflict among occupants and the building operator to automatically generate non-conflicting setpoints for the BAS based on the building's operational mode, e.g., energy efficiency or demand response. The collaborative softThermostat and FMDashboard according to embodiments of the invention can be utilized to facilitate the communication between the facility manager and occupants, and among occupants themselves. Social networking can be adopted to enhance communication between occupants as well as to promote energy conservation behavior. The cEMC controller according to an embodiment of the invention includes several function modules. Collaborative business logic for each occupant is organized in Apps, which can be downloaded to occupants' configuration space per request. Potential conflicting requirements from occupants' spaces can be detected and resolved by arbitration logic, which is configured by the facility manager to balance energy performance and comfort. The arbitration logic is also encapsulated in Apps, so that the facility manager may change them at will. The system requires building configuration data from a commission engineer, who can also set up a private App portal for facility managers and occupants to download their Apps. Collaborative business logic and arbitration logic is more fully described in the inventors pending application, "Method and System for Energy Efficient Collaborative High Performance Building Control", application Ser. No. 13/560,186 filed on Jul. 27, 2012, assigned to the same assignee as the present application, the contents of which are herein incorporated by reference in their entirety.

A cEMC system according to an embodiment of the invention includes several addition features. An advanced FM Dashboard for whole building dashboard provides flexible control rule configuration tools to support the management of building energy and performance goals. Similarly, an advanced occupant HMI can enable comfort range specifications instead of fixed temperature/humidity settings to allow the building control system to optimize energy saving and manage peak load with fewer constraints, includes attractive graphs to display occupant energy use in real-time, carbon emissions, and long term energy use trends and to analyze occupant behavior, and a user-friendly scheduler for occupants to input their weekly occupancy/task schedules. An intelligent cEMC Controller can control HVAC and lighting systems to provide cooling/heating/ventilation and lighting only as needed. A social network energy management environment can help occupants to compare their energy use with their peers, set reference points, and encourage compliance and competitiveness among occupants.

A cEMC system according to an embodiment of the invention also includes an open building energy and control platform based on a Building Control App concept. Building Control Apps are Rule files describing occupancy based comfort control logic and facility manager's control rules. Building Control Apps have their own format and define programming methods for building automation purposes. Occupants and building operators can either use text editors or graphical Rule editors to develop the App. All of the collaborative Building Control Apps according to embodiments of the invention can be hosted either by a private App store inside an organization, or by third party web sites, such as Google or Facebook. The Apps are platform independent, so that a consistent user experience can be offered across desktops, laptops, smart phones, tablets, and other devices. Many tasks that previously required weeks of effort from professional engineers can be achieved by occupants and facility managers/building operators with several clicks on the mouse. No software programming skill is required. This significantly reduces engineering costs and offer occupants control opportunities never seen in existing systems.

Figure 4A:
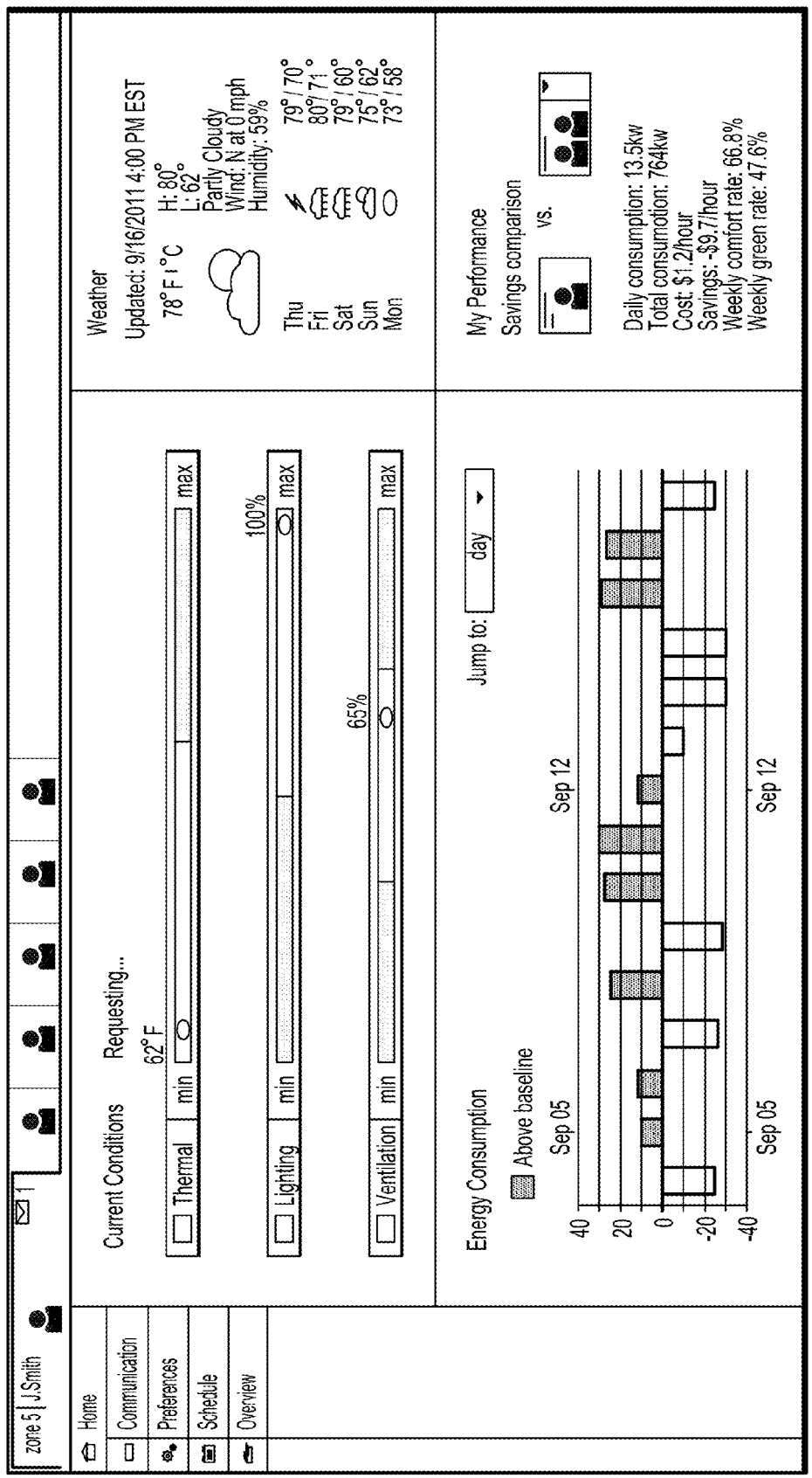
FIGS. 4a-b show exemplary screen examples of an occupant HMI, according to an embodiment of the invention.
Figure 4B:
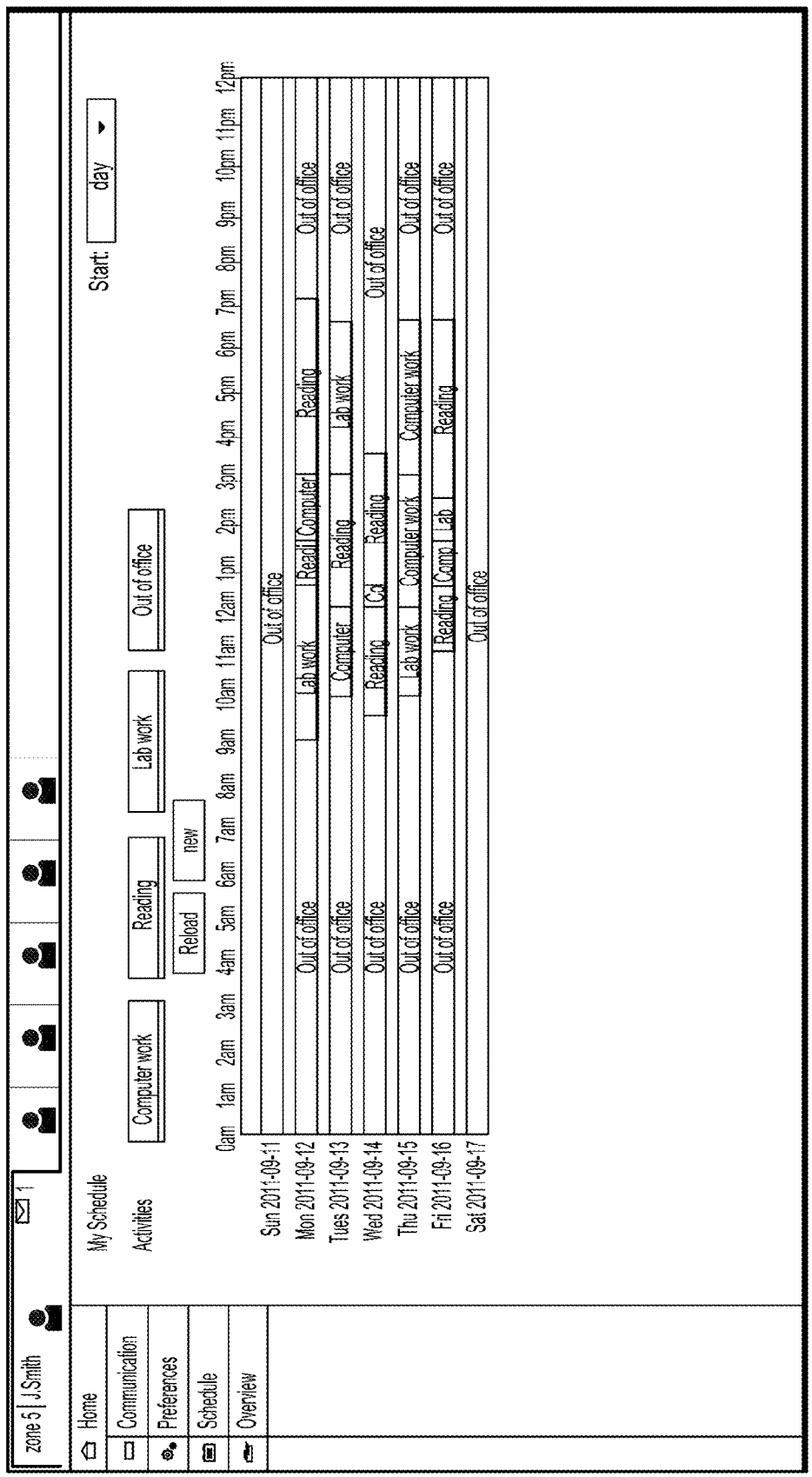
Figure 5A:
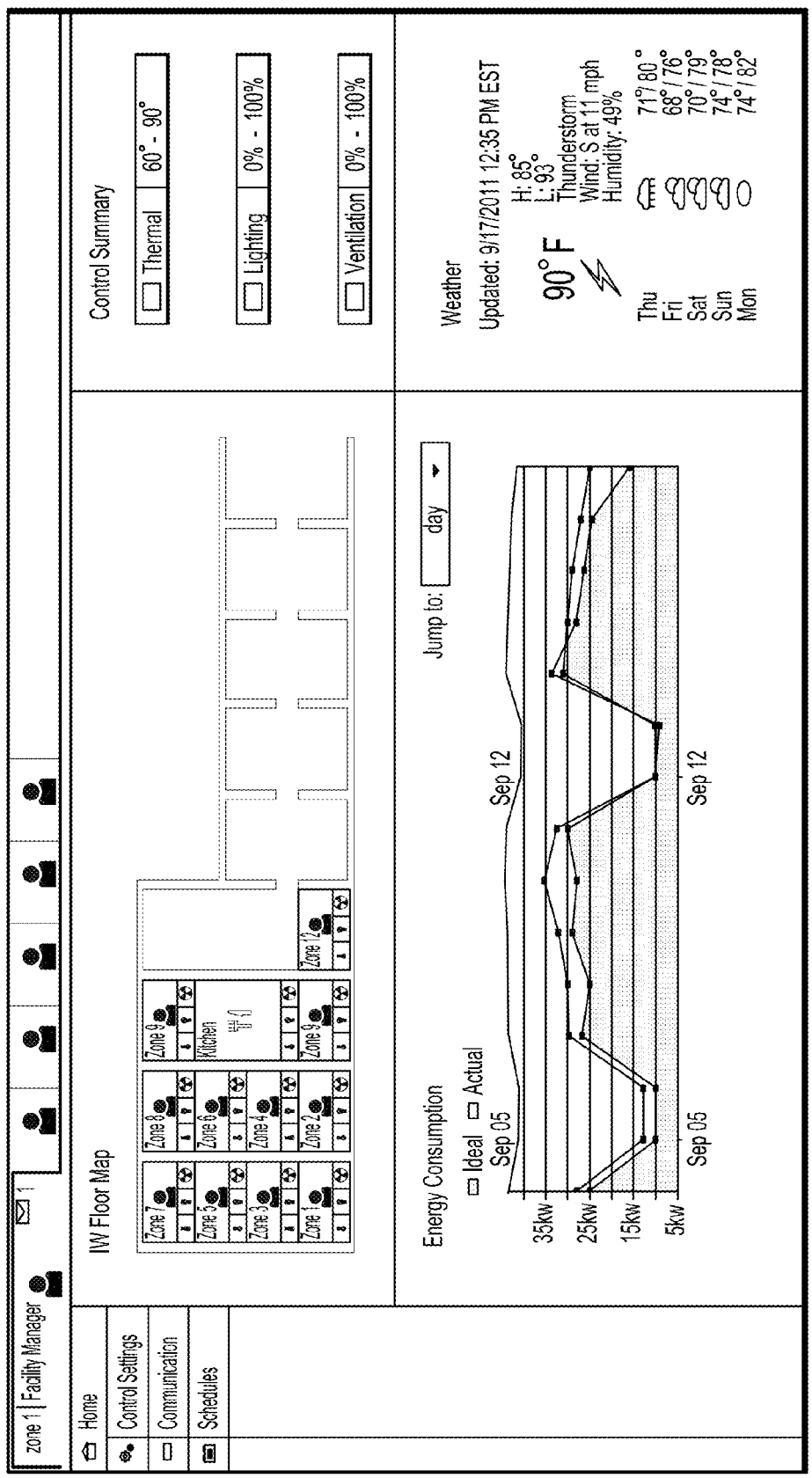
FIGS. 5a-b show exemplary screen examples of a facility manager HMI, according to an embodiment of the invention.
Figure 5B:
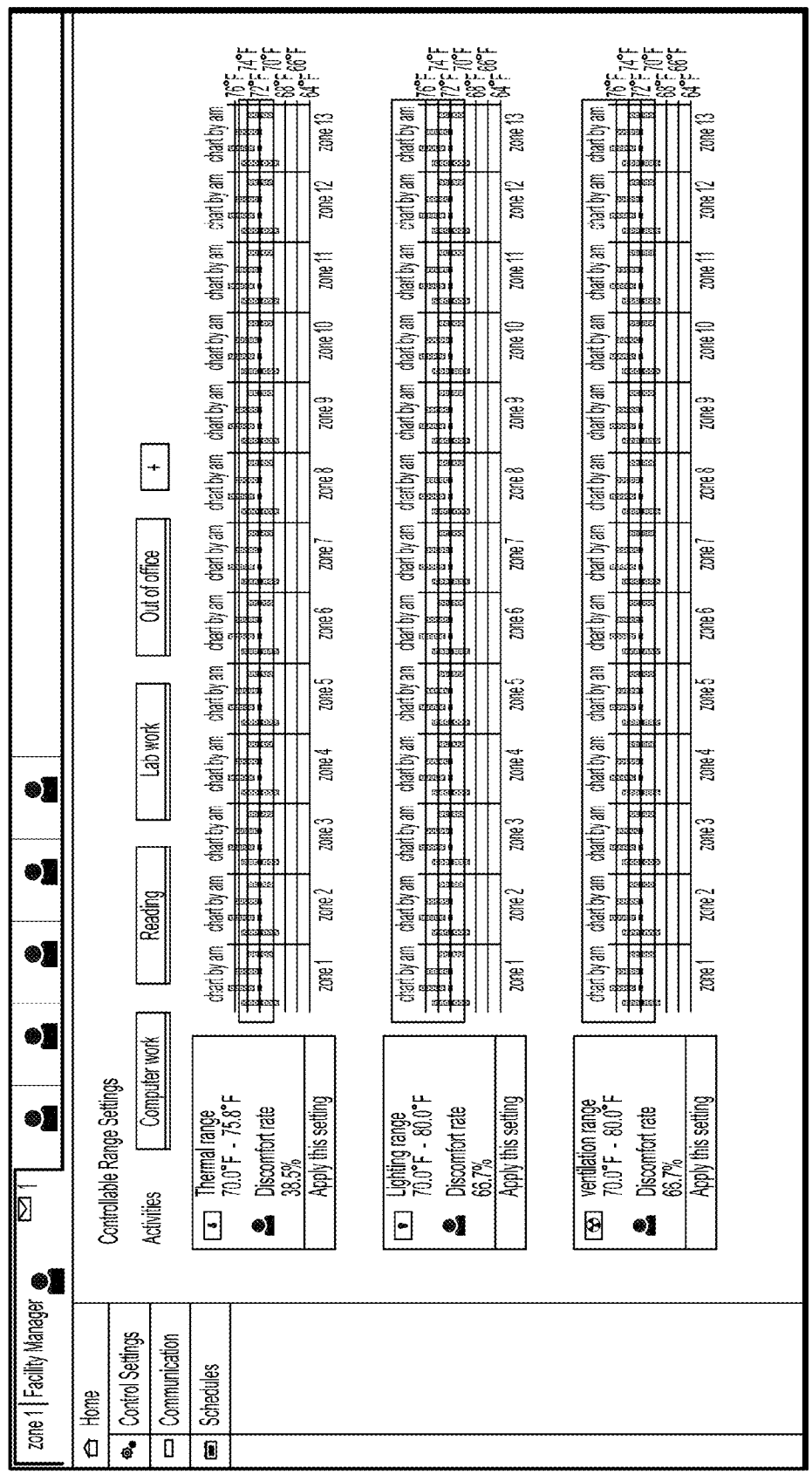

Embodiments of the invention include advanced HMIs that support collaborative control that allows interactive communications and collaborations between occupants and facility managers to refine energy policies in ways that optimize energy saving and improve occupants' comfort. An Occupants' HMI according to an embodiment of the invention, referred to herein as a "softThermostat", allows occupants to change the occupant setpoints, to input their activity and schedule information, as well as to define their preferences. FIG. 4a shows an exemplary, non-limiting softThermostat, and FIG. 4b shows an exemplary softThermostat for an occupant to enter their weekly schedule. A Facility Manager's HMI according to an embodiment of the invention, referred to herein as an "FMDashboard", supports facility managers by enabling them to view current building energy performance and the aggregated information provided by all occupants. FIG. 5a depicts an exemplary Facility Manager's HMI, and FIG. 5b depicts how facility managers can view the aggregated preference information provided by the occupants.

Figure 11:
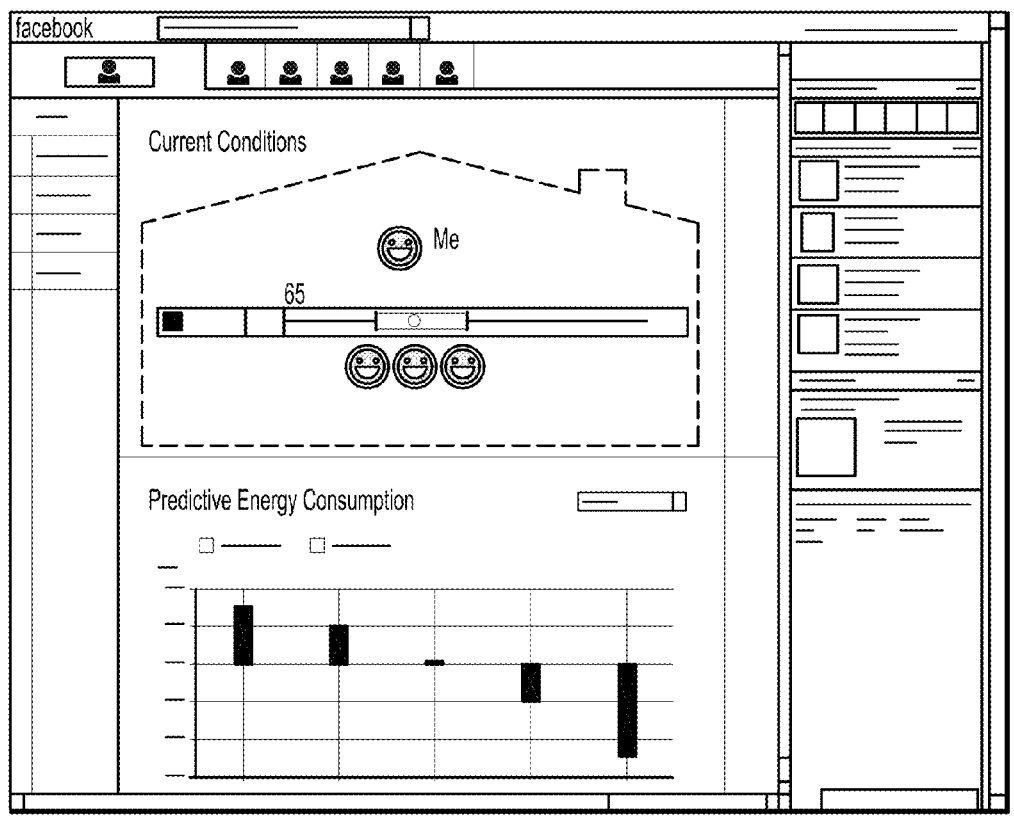
FIG. 11 shows an exemplary, non-limiting private social network user interface, according to an embodiment of the invention.
Figure 12:
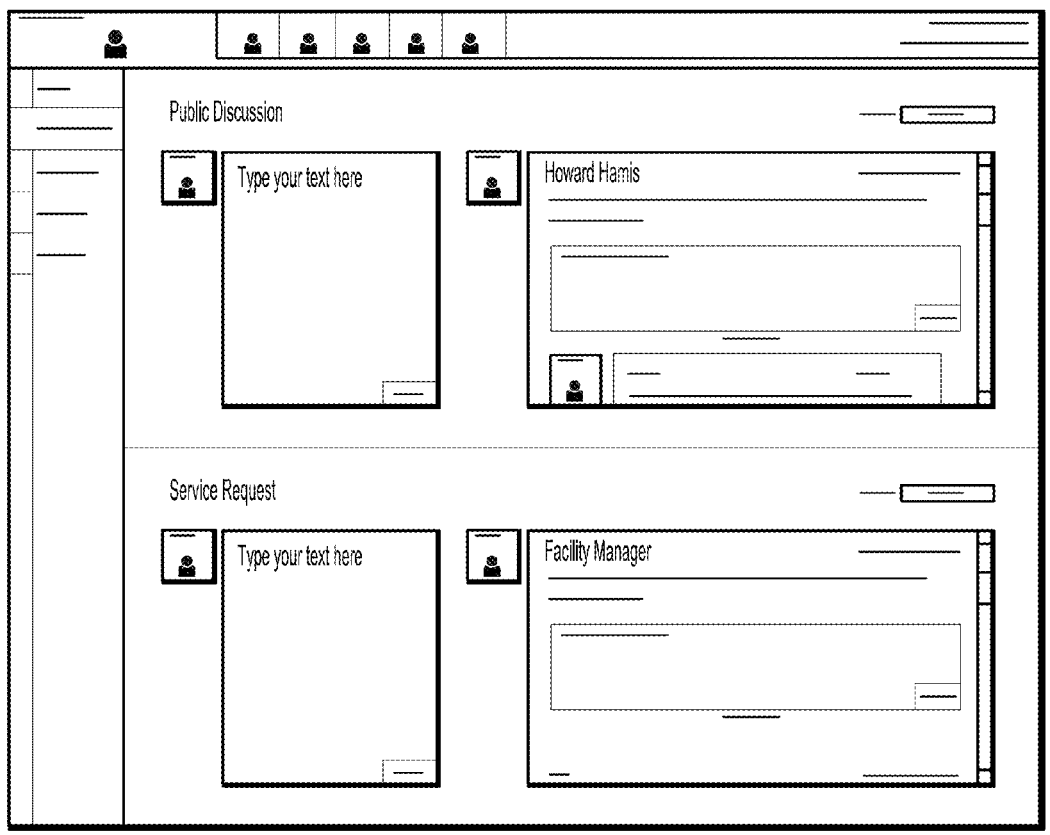
FIG. 12 shows a cEMC occupant's view as a Facebook App, according to an embodiment of the invention.

Based on occupants' inputs of preferences and schedules, both the Occupant's and the Facility Manager's HMIs can visualize energy efficiency information as calculated by the cEMC Controller and the comfort information based on a match level between the current condition information and the occupants' preferences. This match can be calculated by an analytical engine that is disclosed in the inventors pending application, "Method and System for Energy Efficient Collaborative High Performance Building Control", incorporated by reference above. The HMIs according to embodiments of the invention also support social-networking for the occupants and facility managers for easy and efficient communications and collaborations, as well as encouraging energy saving behaviors. FIG. 11 shows an exemplary, non-limiting private social network user interface, and FIG. 12 shows a cEMC occupant's view as a Facebook App. One feature of an Occupants' HMI according to an embodiment of the invention is comfort voting, through which occupants can provide their immediate feedback regarding building conditions. Through an advanced collaborative HMI according to an embodiment of the invention, facility managers can also easily create a Demand Response event and effectively disseminate information to all occupants.

Figure 6:
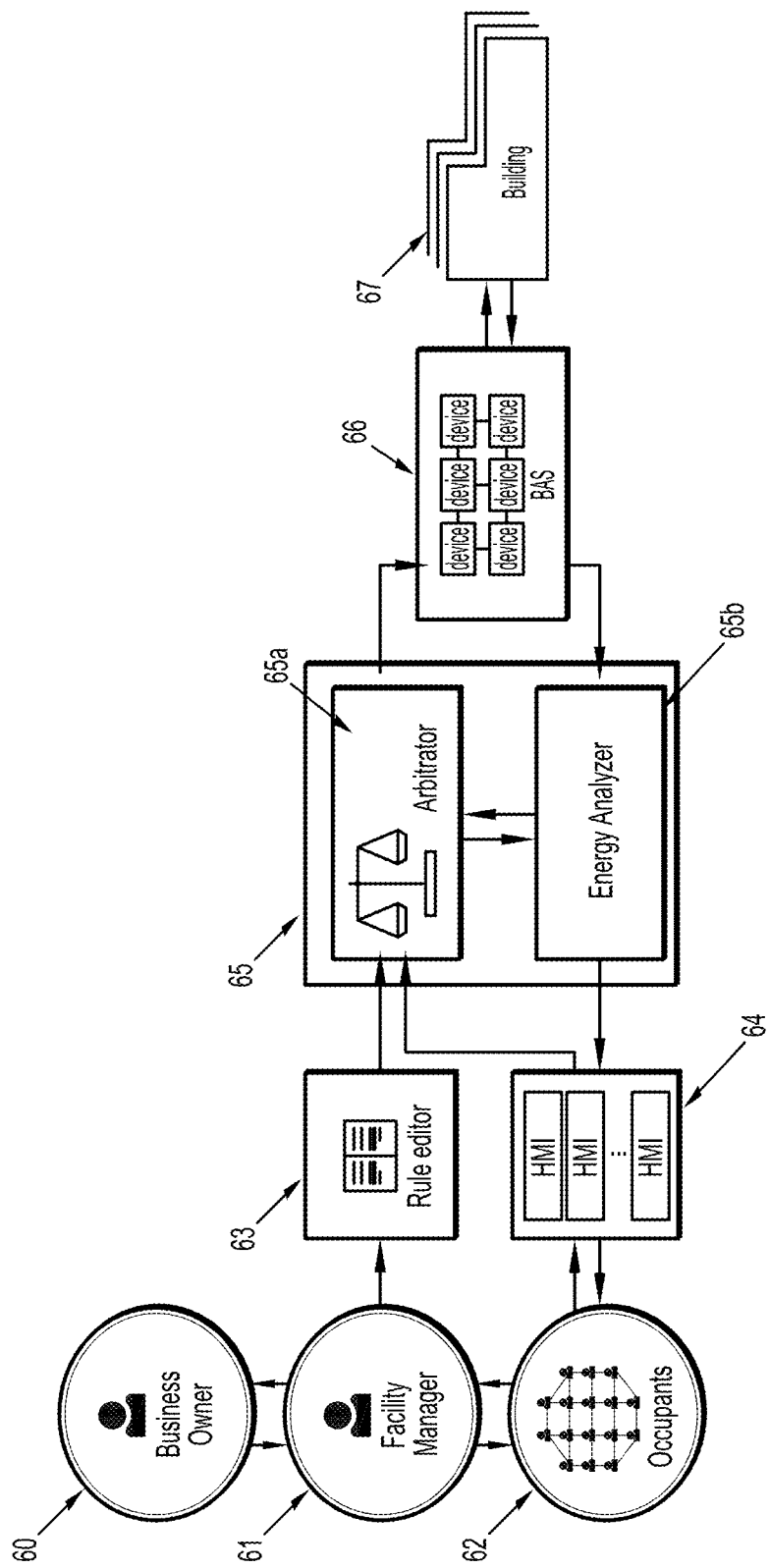
FIG. 6 depicts an exemplary, non-limiting collaborative setpoint arbitration and feedback architecture, according to an embodiment of the invention.

Automatic temperature setpoint conflict arbitration is a key application of a cEMC according to an embodiment of the invention. Energy efficient arbitration rules are typically building-specific and time-varying. Embodiments offer a flexible Rule Engine, which can load arbitration logic provided by facility managers. A Rule Engine is more fully described in the inventors pending application, "Method and System for Energy Efficient Collaborative High Performance Building Control", incorporated by reference above. With a graphical Rule Editor according to an embodiment of the invention, facility managers can adjust the rules without hiring professional software engineers. FIG. 6 depicts an exemplary, non-limiting collaborative setpoint arbitration and feedback architecture, according to an embodiment of the invention. As shown in FIG. 6, a building owner 60 is in two-way communication with the facility manager 61, who in turn is in two-way communication with the occupants 62. The facility manager 61 can use the rule editor of the FMDashboard HMI 63 to adjust rules, which are provided as input to an arbitrator 65a of the energy management controller 65. The arbitrator 65a and an energy analyzer 65b of the energy management controller 65 are in two way communication with each other. The occupants 62 can provide their preferences to the arbitrator via the advanced HMI's 64, and can receive energy policy results back from the energy analyzer of the energy management controller 65. In addition, the analytic engine is in two way communication with the various BAS devices which in turn are in two way communication with the building, to control the devices and receive feedback regarding the state of the building. The energy management controller 65, arbitrator 65a and energy analyzer 65b are more fully described in the inventors pending application, "Method and System for Energy Efficient Collaborative High Performance Building Control", incorporated by reference above. The inputs of "Arbitrator" in FIG. 6 may be conflicting: (1) the requirements from different occupants can be conflicting; and (2) occupants' requirements or configuration may violate rules from the facility manager. After execution of the arbitration rules, the outputs of the "Arbitrator" are energy efficient setpoints without conflicts.

Figure 7:
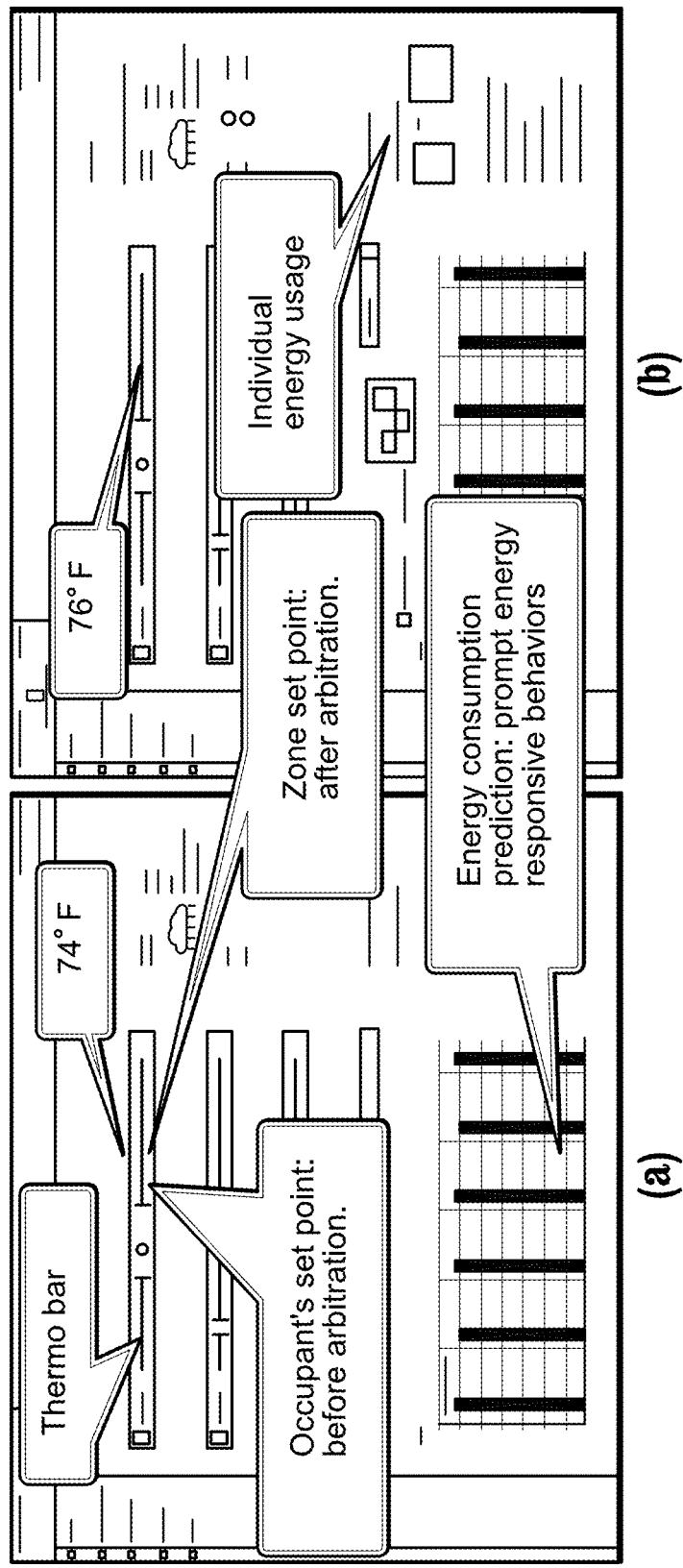
FIGS. 7(a) and (b) depict exemplary screen shots of an exemplary temperature arbitration rule, according to an embodiment of the invention.

Screen shots of an exemplary temperature arbitration rule are shown in FIGS. 7(a) and (b). Assume that two occupants, Volker and Shary, share adjacent thermal zones, where the zone temperature setpoint differences cannot be more than 2° F. due to hardware limits and energy considerations. Shary and Volker can input their temperature setpoints in softThermostat by sliding the circle in the "thermo" bar. The outputs after arbitration, depicted in black dots, are 74° F. and 76° F., respectively, and these are the value the BAS received. Therefore, the 2° F. temperature constraint is satisfied. If the occupants change the setpoints, the estimated energy consumption, which is calculated by Energy Analyzer 65b of FIG. 6, can be visualized at the bottom of the HMI to prompt energy responsive behavior.

Typical building automation systems either (1) implement static schedules that are defined by facility managers, or (2) install occupancy sensors. For office environments, the static schedule is frequently twice as long as real working hours. An cEMC according to an embodiment of the invention can support an individual calendar for every occupant, so that energy can be saved by dynamic scheduling and predictive control. A screen shot of one occupant's calendar is shown in FIG. 4b.

Figure 8:
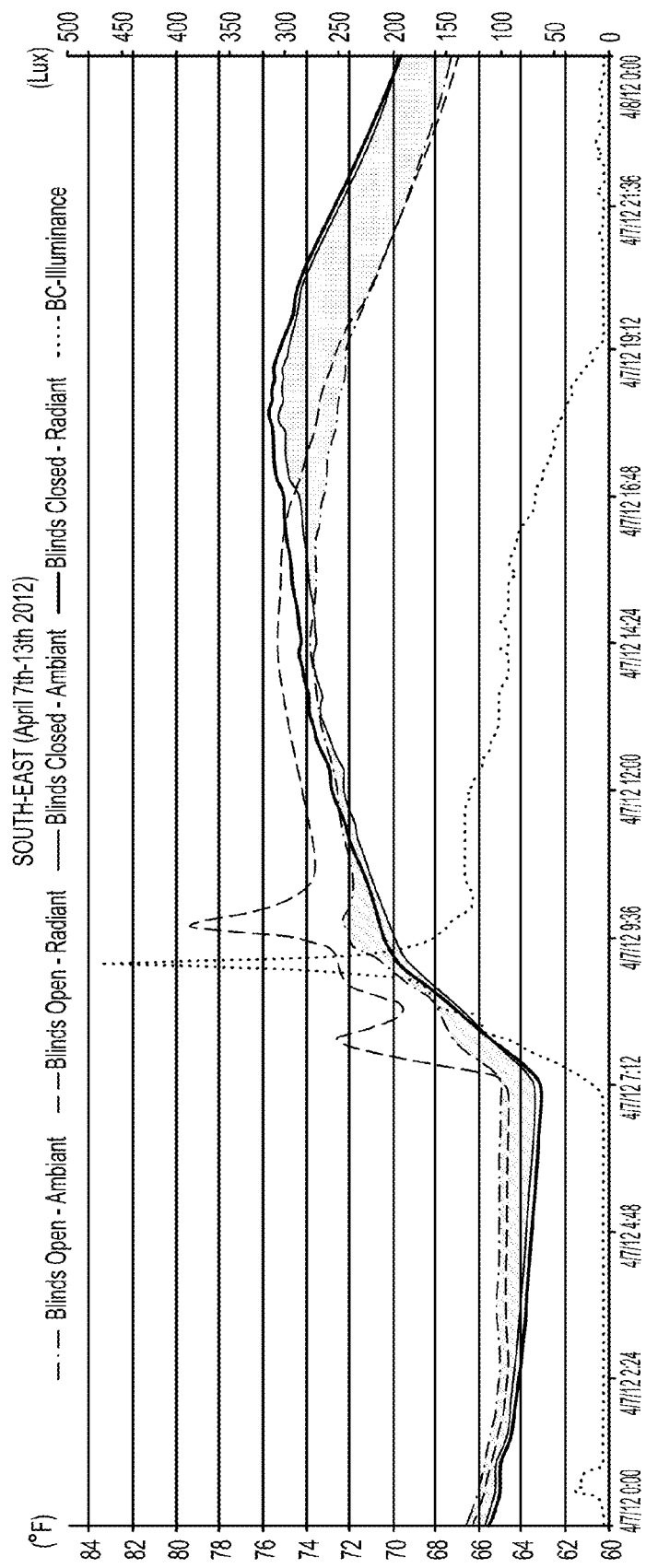
FIG. 8 is a graph of experimental data used for blind/louver control development, according to an embodiment of the invention.
Figure 9:
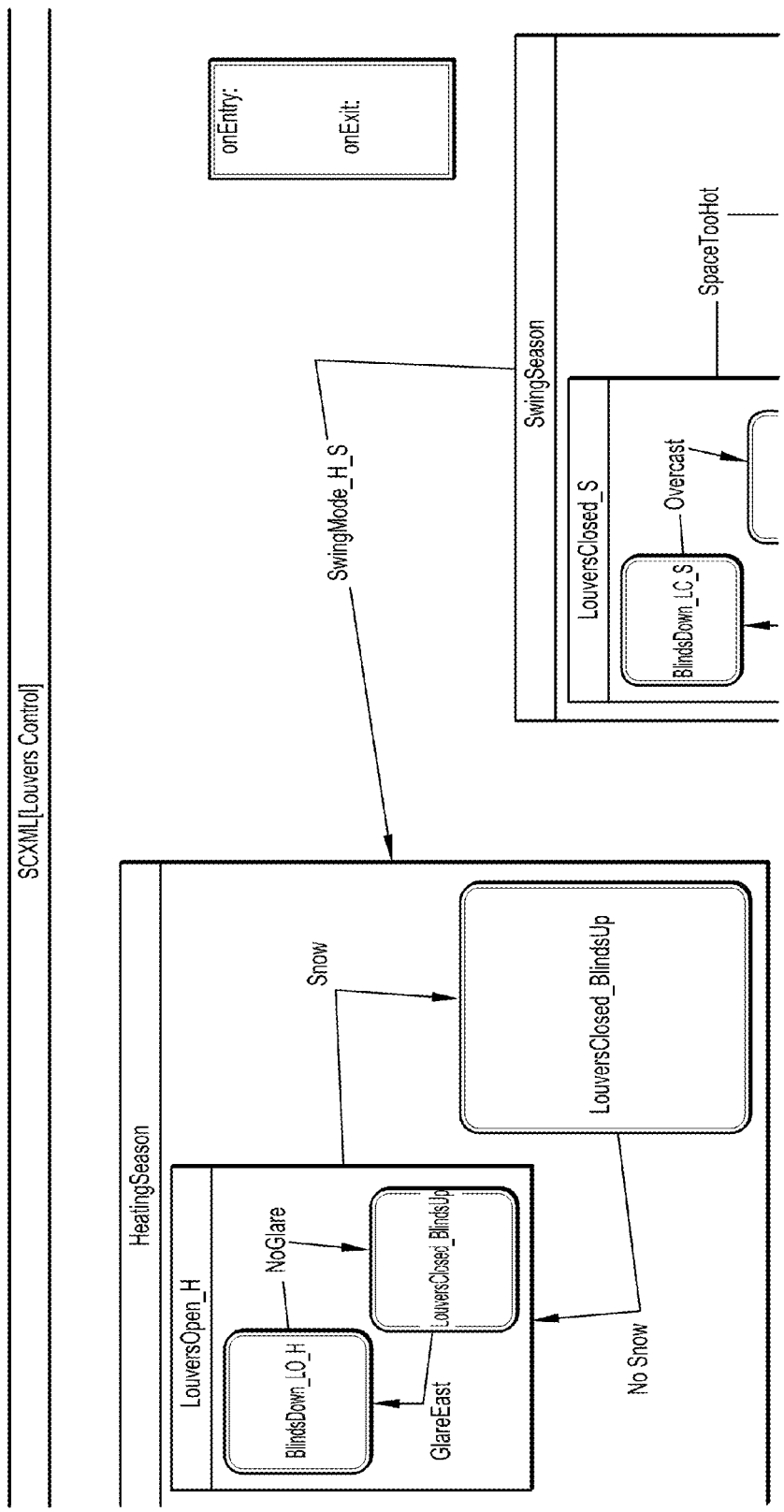
FIG. 9 depicts a blinds and louver control sequence in a graphical Rule Editor, according to an embodiment of the invention.
Figure 10:
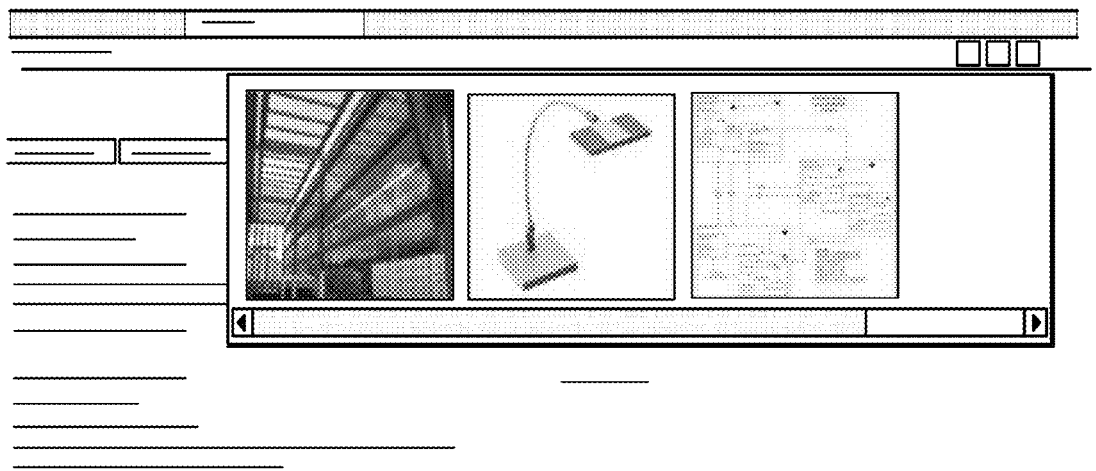
FIG. 10 depicts rule files are wrapped as a Google Chrome App, according to an embodiment of the invention.
Figure 13:
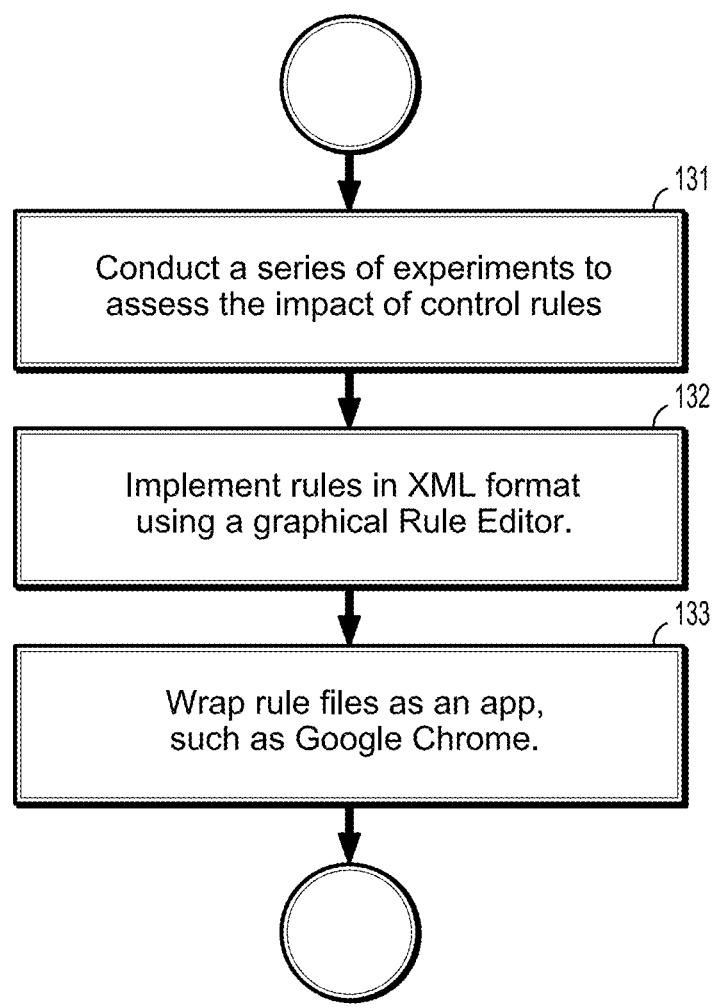
FIG. 13 is a flowchart of a development process of an App for controlling blinds and louvers, according to an embodiment of the invention.

In addition to a temperature setpoint Arbitrator according to an embodiment of the invention, embodiments implemented different energy efficient building control rules as building control Apps. An exemplary, non-limiting development process of an App for blinds and louver control, which can harvest day light, reduce glare, avoid excessive heating in summer, and intake solar radiation in winter, is as follows, with reference to the flowchart depicted in FIG. 13. A first step 131 is to conduct a series of experiments to assess the impact of control rules. FIG. 8 is a graph of experimental data used for blind/louver control development. Then, at step 132, rules were implemented in XML format using a graphical Rule Editor. FIG. 9 depicts a blinds and louver control sequence in a graphical Rule Editor. Finally, at step 133, according to embodiments, rule files are wrapped as an App, such as the Google Chrome App example in FIG. 10. Apps for other platform can be developed following the same process. In addition, existing rules set can be customized for specific building control Apps. Existing rules include artificial lighting control, natural ventilation, occupancy-based setpoint optimization, and weather predictive setpoint control.

Another feature of a cEMC according to embodiments of the invention is social networking capabilities for facilitating the communications and collaborations between occupants and facility managers. Social networking capabilities according to embodiments of the invention also enables applications such as occupants' comfort voting and the demand response control from the facility manager.

Embodiments support at least two strategies for social network integration: Private vs. public social network engine integrations. For a private social network engine, a cEMC according to an embodiment of the invention includes an internal social networking engine for occupants and facility managers to exchange their opinions on building performance and control issues. For example, if one occupant feels the zone temperature setpoint after arbitration is still too hot, the occupant can send messages to colleagues in the adjacent zone, or complaints to the facility manager. A exemplary, non-limiting private social network screen is shown in FIG. 11.

Embodiments can also be integrated to third party social network solutions. For example, FIG. 12 depicts a cEMC according to an embodiment of the invention provided as a Facebook App. Occupants log into a cEMC according to an embodiment of the invention using Facebook accounts, and can invite their friends located in the same building to join the cEMC app. Features of integrating cEMC according to an embodiment of the invention with the Facebook platform include (1) leveraging the popularity and visibility of Facebook to promote the adoption of a cEMC according to an embodiment of the invention; (2) leveraging a social networking platform, e.g., friends in Facebook; and (3) reusing the Facebook login feature. However, the security and privacy issues of integrating with Facebook can be a concern for many organizations.

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 14:
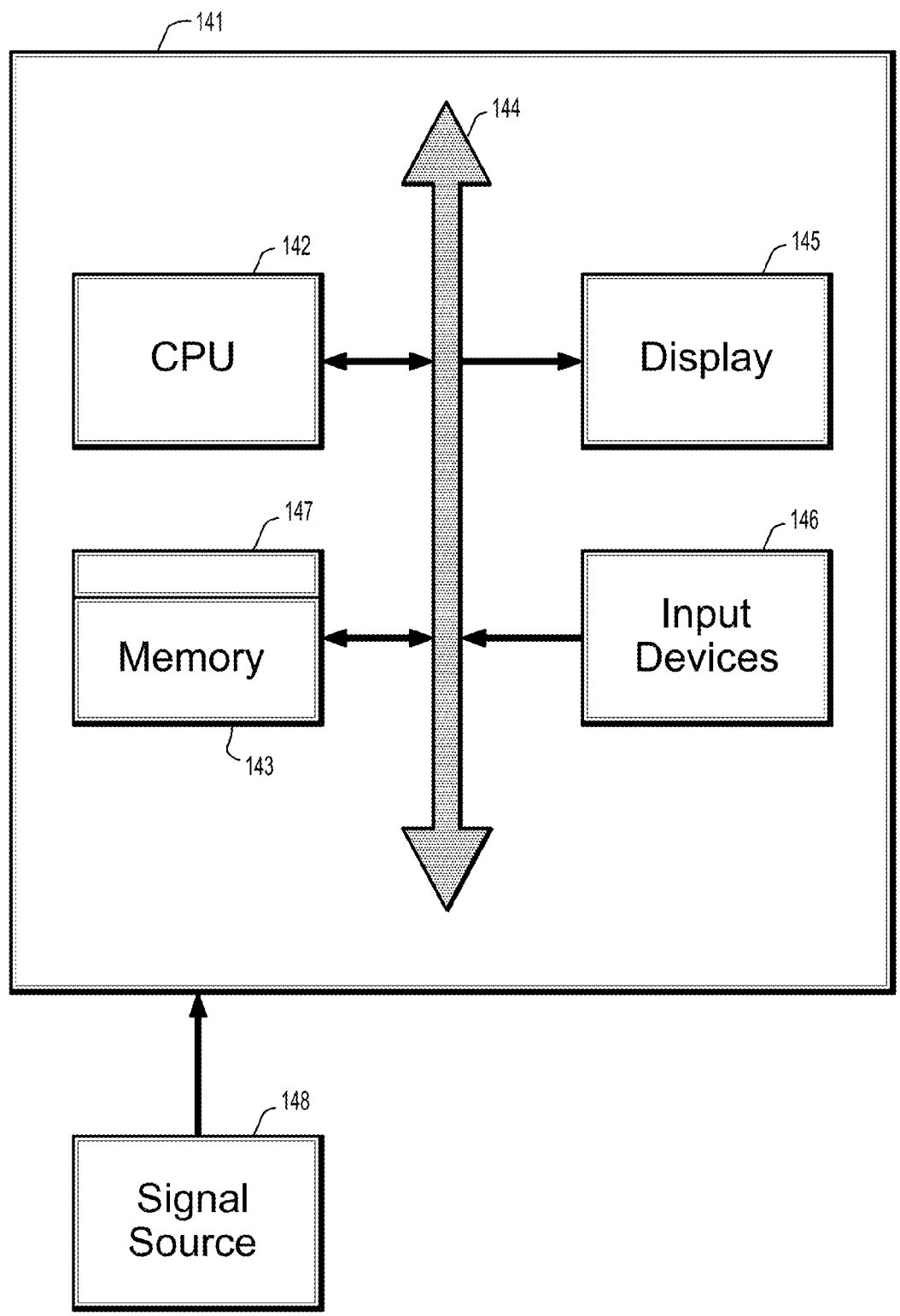
FIG. 14 is a block diagram of an exemplary computer system for implementing a system for an advanced human-machine interface for collaborative building control, according to an embodiment of the invention.

FIG. 14 is a block diagram of an exemplary computer system for implementing a system for an advanced human-machine interface for collaborative building control according to an embodiment of the invention. Referring now to FIG. 14, a computer system 141 for implementing the present invention can comprise, inter alia, a central processing unit (CPU) 142, a memory 143 and an input/output (I/O) interface 144. The computer system 141 is generally coupled through the I/O interface 144 to a display 145 and various input devices 146 such as a mouse and a keyboard. The support circuits can include circuits such as cache, power supplies, clock circuits, and a communication bus. The memory 143 can include random access memory (RAM), read only memory (ROM), disk drive, tape drive, etc., or a combinations thereof. The present invention can be implemented as a routine 147 that is stored in memory 143 and executed by the CPU 142 to process the signal from the signal source 148. As such, the computer system 141 is a general purpose computer system that becomes a specific purpose computer system when executing the routine 147 of the present invention.

The computer system 141 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A system for collaborative energy management and control in a building, comprising:
an energy management controller for a building;
one or more occupant human-machine interfaces (HMIs) that supports two-way communication between building occupants and a facility manager, and between building occupants and the energy management controller; and
a facility manager HMI that supports two-way communication between the facility manager and the building occupants, and between the facility manager and the energy management controller,
wherein said occupant HMI allows building occupants to provide comfort preferences to the facility manager and the energy management controller, and said facility manager HMI allows the facility manager to configure an energy policy for the building as a set of rules and to view occupants' aggregated comfort preferences, and the energy management controller determines an optimum comfort parameter range that resolves conflicting occupant comfort preferences and occupant comfort preferences that conflict with the facility manager's energy policy for the building.

2. The system of claim 1, wherein said occupant HMI allows building occupants to provide schedule information to the facility manager and energy management controller, wherein said schedule specifies different activities for each occupant, wherein the energy management controller supports an individual schedule for each occupant and their specific activities, and provides cooling, heating, ventilation and lighting in the building as determined by the occupants' schedule and activity information.

3. The system of claim 1, wherein said occupant HMI displays occupant energy use in real-time, changes in energy use due to changes in the occupant's comfort parameters, and long term energy use trends based on the occupant's specific activities as determined by the energy management controller.

4. The system of claim 1, wherein said comfort parameters include temperature, humidity, lighting and ventilation, and said occupant HMI provides a temperature and humidity ranges for the comfort parameters to the facility manager and the energy management controller.

5. The system of claim 1, further comprising a social network supported by the occupant HMIs and the facility HMI, said social network adapted to facilitating communication between the occupants and the facility manager, and allowing occupants to provide feedback to the facility manager regarding building conditions, and allowing facility managers to disseminate information to all the occupants.

6. The system of claim 5, wherein said social network is provided by a third party.

7. The system of claim 5, wherein said social network is provided over a network internal to the collaborative energy management and control system for the building.

8. The system of claim 1, further comprising a plurality of rule file apps, said rule file apps describing occupants' comfort control preferences and said facility manager's energy policy in a format executable by said energy management controller.

9. A system for collaborative energy management and control in a building, comprising:
one or more occupant human-machine interfaces (HMIs) that supports two-way communication between building occupants and a facility manager;
a facility manager HMI that supports two-way communication between the facility manager and the building occupants, wherein said occupant HMI allows building occupants to provide comfort preferences to the facility manager, and said facility manager HMI allows the facility manager to configure an energy policy for the building as a set of rules and to view occupants' aggregated comfort preferences; and
a social network supported by the occupant HMIs and the facility HMI, said social network adapted to facilitating communication between the occupants and the facility manager, and allowing occupants to provide feedback to the facility manager regarding building conditions, and allowing facility managers to disseminate information to all the occupants.

10. The system of claim 9, further comprising an energy management controller for the building adapted to determining an optimum comfort parameter range that resolves conflicting occupant comfort preferences and occupant comfort preferences that conflict with the facility manager's energy policy for the building, wherein the occupants' HMI supports two-way communication between building occupants and the energy management controller, and the facility manager's HMI supports two-way communication between the facility manager and the energy management controller.

11. The system of claim 9, further comprising a plurality of rule file apps, said rule file apps describing occupants' comfort preferences and said facility manager's energy policy in a format executable by said energy management controller.

12. A non-transitory program storage device readable by a computer, tangibly embodying a program of instructions executed by the computer to implement a system for collaborative energy management and control in a building, the system comprising:
- an energy management controller for a building;
- one or more occupant human-machine interfaces (HMIs) that supports two-way communication between building occupants and a facility manager, and between building occupants and the energy management controller; and
- a facility manager HMI that supports two-way communication between the facility manager and the building occupants, and between the facility manager and the energy management controller,
- wherein said occupant HMI allows building occupants to provide comfort preferences to the facility manager and the energy management controller, and said facility manager HMI allows the facility manager to configure an energy policy for the building as a set of rules and to view occupants' aggregated comfort preferences, and the energy management controller determines an optimum comfort parameter range that resolves conflicting occupant comfort preferences and occupant comfort preferences that conflict with the facility manager's energy policy for the building.

13. The computer readable program storage device of claim 12, wherein said occupant HMI allows building occupants to provide schedule information to the facility manager and energy management controller, wherein said schedule specifies different activities for each occupant, wherein the energy management controller supports an individual schedule for each occupant and their specific activities, and provides cooling, heating, ventilation and lighting in the building as determined by the occupants' schedule and activity information.

14. The computer readable program storage device of claim 12, wherein said occupant HMI displays occupant energy use in real-time, changes in energy use due to changes in the occupant's comfort parameters, and long term energy use trends based on the occupant's specific activities as determined by the energy management controller.

15. The computer readable program storage device of claim 12, wherein said comfort parameters include temperature, humidity, lighting and ventilation, and said occupant HMI provides a temperature and humidity ranges for the comfort parameters to the facility manager and the energy management controller.

16. The computer readable program storage device of claim 12, the system further comprising a social network supported by the occupant HMIs and the facility HMI, said social network adapted to facilitating communication between the occupants and the facility manager, and allowing occupants to provide feedback to the facility manager regarding building conditions, and allowing facility managers to disseminate information to all the occupants.

17. The computer readable program storage device of claim 16, wherein said social network is provided by a third party.

18. The computer readable program storage device of claim 16, wherein said social network is provided over a network internal to the collaborative energy management and control system for the building.

19. The computer readable program storage device of claim 12, the system further comprising a plurality of rule file apps, said rule file apps describing occupants' comfort control preferences and said facility manager's energy policy in a format executable by said energy management controller.

* * * * *